US012628028B2

(12) United States Patent　　　　(10) Patent No.:　　US 12,628,028 B2
　　Boodannavar　　　　　　　　　　　(45) Date of Patent:　　May 12, 2026

(54) METHOD AND SYSTEM FOR TRAFFIC ENGINEERING SUPPORTING REAL-TIME APPLICATIONS

(71) Applicant: Apple Inc., Cupertino, CA (US)

(72) Inventor: Veerendra Boodannavar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 789 days.

(21) Appl. No.: 17/951,376

(22) Filed: Sep. 23, 2022

(65) Prior Publication Data

US 2023/0397038 A1　　　Dec. 7, 2023

Related U.S. Application Data

(60) Provisional application No. 63/348,891, filed on Jun. 3, 2022.

(51) Int. Cl.
　　*H04L 47/2475*　　　(2022.01)
　　*H04L 45/302*　　　　(2022.01)
　　　　　　　(Continued)

(52) U.S. Cl.
　　CPC ..... *H04W 28/0236* (2013.01); *H04L 45/3065* (2013.01); *H04L 47/2416* (2013.01);
　　　　　　　(Continued)

(58) Field of Classification Search
　　CPC . H04W 72/25; H04W 72/40; H04W 52/0245; H04W 72/1226; H04W 40/12;
　　　　　　　(Continued)

(56) References Cited

U.S. PATENT DOCUMENTS

2006/0253735 A1*　11/2006　Kwak ............... H04W 52/0277
　　　　　　　　　　　　　　　　　　714/12
2017/0006117 A1*　1/2017　Kafle ................... H04L 65/612
　　　　　　　　(Continued)

OTHER PUBLICATIONS

IEEE P802. 11REVme_D0.0, Draft Standard for Information technology—Telecommunications and Information Exchange between Systems Local and Metropolitan Area Networks—Specific Requirements, Part 11: Wireless LAN Medium Access Control (MAC) and Physical Layer (PHY) Specifications; 4,608 pages.

*Primary Examiner* — Salvador E Rivas
(74) *Attorney, Agent, or Firm* — Sterne, Kessler, Goldstein & Fox P.L.L.C.

(57)　　　　　ABSTRACT

Embodiments are disclosed for traffic engineering in support of real-time applications. A user equipment (UE) can detect a real-time application running on the UE, assess a link health corresponding to the real-time application, and transmit a payload including the link health to a peer device via WiFi communications. To detect the real-time application, the UE can receive traffic symptoms or application indications, and monitor corresponding traffic flows. To assess the link health, the UE can receive link quality metrics of a link corresponding to the link health, and determine an intra basic service set (BSS) clear channel assessment (CCA) percentage. The UE can initiate a Rapport session with the peer device, activate a keep-alive timer, and transmit updated information to the peer device according to the keep-alive timer.

20 Claims, 11 Drawing Sheets

(51) Int. Cl.

| | |
|---|---|
| *H04L 47/2416* | (2022.01) |
| *H04L 47/80* | (2022.01) |
| *H04L 49/20* | (2022.01) |
| *H04W 28/02* | (2009.01) |
| *H04W 28/086* | (2023.01) |
| *H04W 40/12* | (2009.01) |
| *H04B 17/318* | (2015.01) |
| *H04L 1/00* | (2006.01) |
| *H04W 52/02* | (2009.01) |

(52) U.S. Cl.
CPC ........ *H04L 47/2475* (2013.01); *H04L 47/801* (2013.01); *H04L 49/206* (2013.01); *H04W 28/0231* (2013.01); *H04W 28/0289* (2013.01); *H04W 28/0865* (2023.05); *H04W 40/12* (2013.01); *H04B 17/318* (2015.01); *H04L 1/0007* (2013.01); *H04W 52/0245* (2013.01)

(58) Field of Classification Search
CPC .......... H04W 28/0865; H04W 28/0231; H04L 12/2418; H04L 29/06884; H04L 29/06897; H04L 45/3065; H04L 47/2416; H04L 47/2475; H04L 47/801; H04L 49/206; H04L 1/0007; H04B 17/318
See application file for complete search history.

(56) References Cited

U.S. PATENT DOCUMENTS

| | | | | |
|---|---|---|---|---|
| 2019/0174101 | A1* | 6/2019 | Modestine ....... | G08B 13/19656 |
| 2020/0110436 | A1* | 4/2020 | Slevinsky ............ | H04W 84/18 |
| 2020/0280863 | A1* | 9/2020 | Cioffi .................... | H04W 16/10 |
| 2021/0204169 | A1* | 7/2021 | Sevindik .......... | H04W 28/0284 |
| 2022/0053406 | A1* | 2/2022 | Lee ...................... | H04W 40/22 |
| 2023/0063048 | A1* | 3/2023 | Fu ......................... | H04W 76/38 |
| 2023/0100298 | A1* | 3/2023 | Shuman ................. | H04W 4/44 370/329 |
| 2025/0055902 | A1* | 2/2025 | Pateromichelakis ... | H04L 67/55 |

* cited by examiner

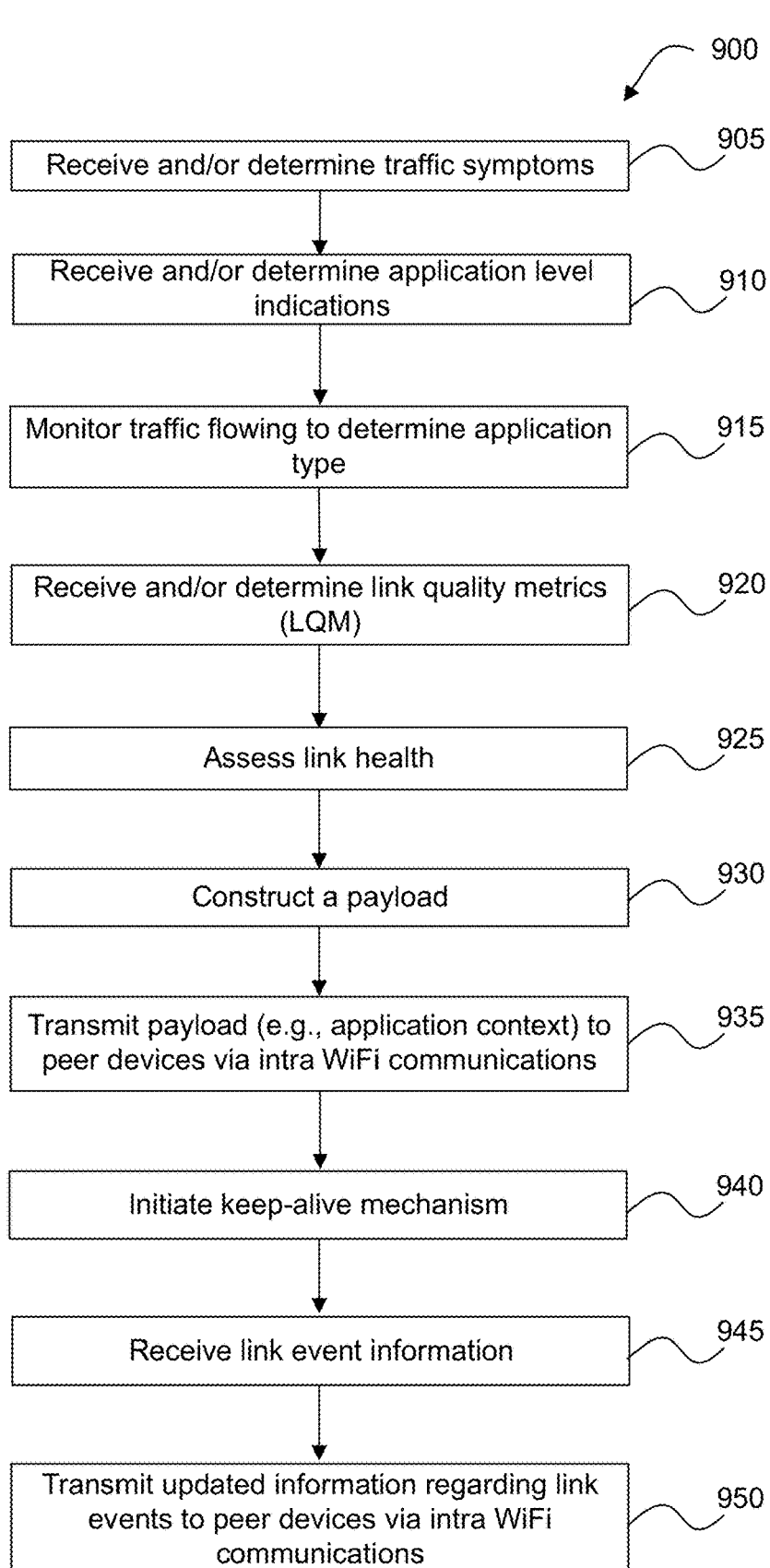

900

905 Receive and/or determine traffic symptoms

910 Receive and/or determine application level indications

915 Monitor traffic flowing to determine application type

920 Receive and/or determine link quality metrics (LQM)

925 Assess link health

930 Construct a payload

935 Transmit payload (e.g., application context) to peer devices via intra WiFi communications 940 Initiate keep-alive mechanism 945 Receive link event information 950 Transmit updated information regarding link events to peer devices via intra WiFi communications

FIG. 9

METHOD AND SYSTEM FOR TRAFFIC ENGINEERING SUPPORTING REAL-TIME APPLICATIONS

CROSS-REFERENCE TO RELATED APPLICATION

This application claims benefit of U.S. Provisional Patent Application No. 63/348,891, filed on Jun. 3, 2022, which is incorporated herein by reference in its entirety.

BACKGROUND

Field

The embodiments relate generally to wireless devices running real-time applications in a wireless communication system.

Related Art

Wireless local area network (WLAN) communications are described in IEEE P802.11REVme_D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications "IEEE P802.11REVme".

SUMMARY

Some embodiments include a system, apparatus, article of manufacture, method, and/or computer program product and/or combinations and sub-combinations thereof, for traffic engineering for real-time applications. Herein, a real-time application transmits/receives latency sensitive traffic. A non-real-time application refers to an application that transmits/receives traffic that is not latency sensitive. Some embodiments include a user equipment (UE) that can detect a real-time application running on the UE, assess the health of a link corresponding to the real-time application, and transmit a payload including the link health, to a peer device via WiFi communications. To detect the real-time application running on the UE, the UE can receive or determine traffic symptoms including: current foreground traffic, current background traffic, or predicted foreground traffic. The UE can also receive or determine application indications including: jitter, latency, loss tolerance, duration, required minimum bandwidth, or preferred bandwidth. The UE can monitor traffic flows corresponding to the traffic symptoms or the application indications, and detect the real-time application based at least on the monitored traffic flows.

The UE can monitor traffic rates of the real-time application and a non-real-time application, and determine that a traffic rate of the non-real-time application satisfies a threshold. After the threshold is satisfied, the UE can dequeue access categories (ACs) corresponding to the real-time application at a greater rate than the access categories corresponding to the non-real-time application.

To assess the link health, the UE can receive or determine link quality metrics corresponding to the link, and determine based at least on the link quality metrics, an intra basic service set (BSS) clear channel assessment (CCA) percentage corresponding to the link. The UE can assess the link health based at least on the intra BSS CCA percentage. To transmit the payload, the UE can construct the payload to include: a BSS identifier (BSSID), a channel identifier, a bandwidth, and/or an application context.

The UE can initiate a Rapport session with the peer device, where the WiFi communications utilize the Rapport session. The UE can activate a keep-alive timer corresponding to the real-time application, and transmit updated information to the peer device according to the keep-alive timer. The UE an also receive link event information corresponding to the link, and transmit second updated information to the peer device according to the link event information, where the link event information can include a disconnect of the link, or an indication that the UE has roamed (e.g., away from the BSS).

In some embodiments a UE can detect a non-real-time application running on the UE, and receive a payload from a peer device on a BSS, where the peer device is running a real-time application. Subsequently, the UE can initiate a congestion control mechanism based at least on the payload. The payload can also include: an identifier of the BSS, a channel identifier, a bandwidth, or an application context. To initiate the congestion control mechanism, the UE can limit uplink (UL) or downlink (DL) transmissions by implementing: a dynamic sleep timer, frame burst transmissions, and/or limited aggregations. The UE can tune a value of the dynamic sleep timer according to a link health of a link corresponding to the real-time application. The UE can establish a Rapport session with the peer device, where the payload is received via the Rapport session, and receive updated information from the peer device regarding the real-time application or a connection of the peer device to the BSS.

In some embodiments, the UE can also detect a second real-time application running on the UE, and determine that a traffic rate of the non-real-time application satisfies a threshold. Subsequently, the UE can dequeue ACs corresponding to the second real-time application at a greater rate than ACs corresponding to the non-real-time application. To detect the non-real-time application running on the UE, the UE can receive or determine traffic symptoms including: current foreground traffic, current background traffic, or predicted foreground traffic. The UE can receive and/or determine application indications including: jitter, latency, loss tolerance, duration, required minimum bandwidth, or preferred bandwidth. The UE can monitor traffic flows corresponding to the traffic symptoms or the application indications, and detect the non-real-time application based at least on the monitored traffic flows.

The UE can assess a link health of a link corresponding to the non-real-time application. For example, the UE can determine or receive link quality metrics corresponding to the link, determine an intra BSS CCA percentage corresponding to the link based at least on the link quality metrics, and assess the link health based at least on the intra BSS CCA percentage.

Further embodiments, features, and advantages of the present disclosure, as well as the structure and operation of the various embodiments of the present disclosure, are described in detail below with reference to the accompanying drawings.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure. Herein, a real-time application transmits or receives latency sensitive traffic, and a non-real-time application refers to an application that transmits or receives traffic that is not latency sensitive.

FIG. 9 illustrates an example method for a UE running a real-time application and implementing traffic engineering across devices, according to some embodiments of the disclosure.

Figure 1:
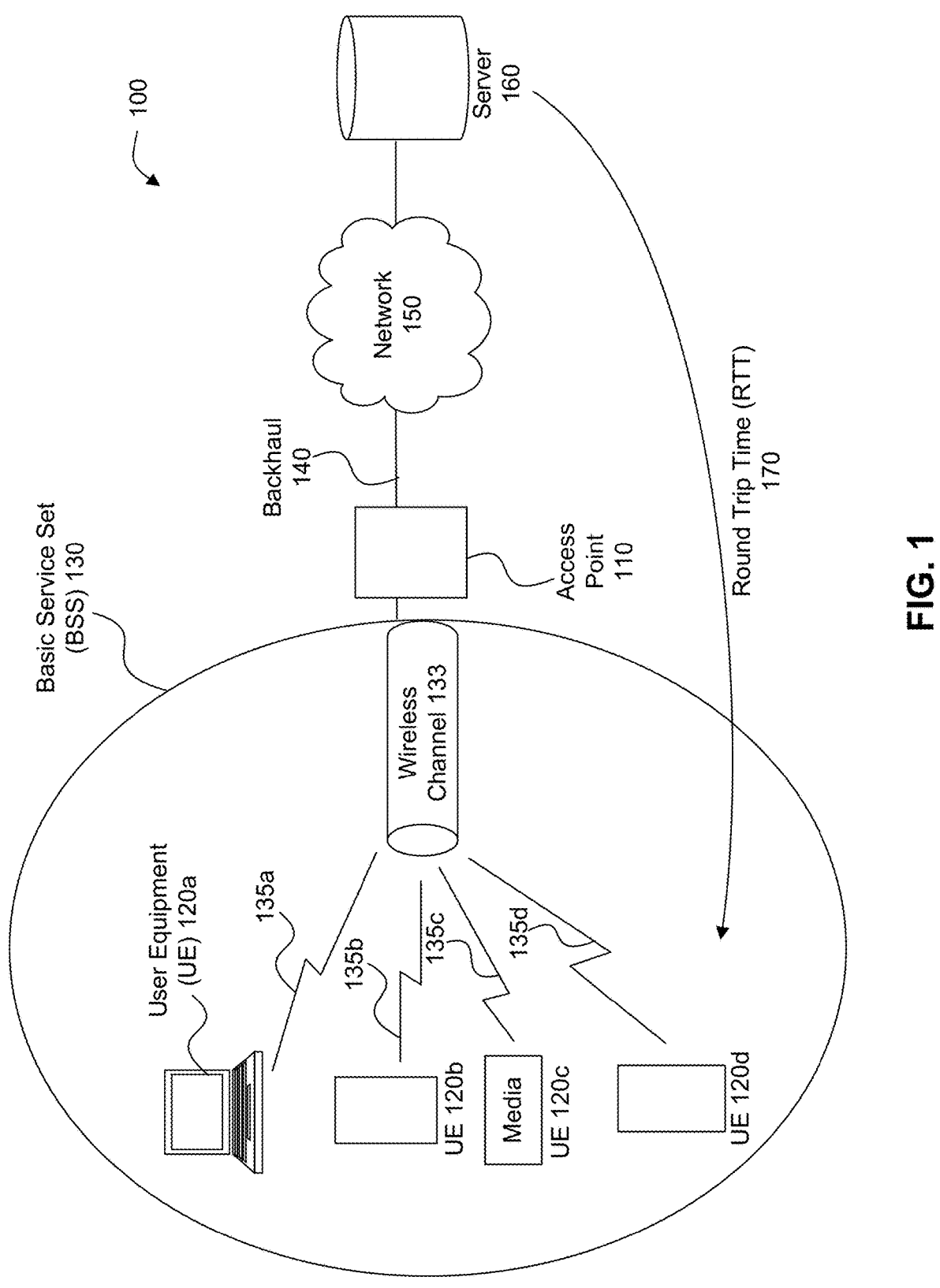
FIG. 1 illustrates an example system implementing traffic engineering for real-time applications, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, article of manufacture, method, and/or computer program product and/or combinations and sub-combinations thereof, for traffic engineering for real-time applications. Herein, a real-time application refers to an application that transmits and/or receives latency sensitive traffic, and a non-real-time application refers to an application whose traffic is not latency sensitive. With the proliferation of electronic devices in a wireless network (e.g., a WiFi network) real-time applications including but not limited to video conferencing, video streaming, and/or voice communication applications running on some electronic devices can experience glitches and/or poor performance when a non-real-time application on the same and/or a different electronic device uploads or downloads large amounts of data on the same wireless network. A non-real-time application is not time sensitive and can include as an example, a software download, or a data back-up. A wireless channel (e.g., 20 MHz or 80 MHz) may become saturated as the number of electronic devices and the amount of data exchanged increases. Accordingly, real-time applications may not access sufficient bandwidth to exchange latency sensitive traffic resulting in poor performance and consequently, poor user experience(s).

Some embodiments enable electronic devices (e.g., user equipment (UE)) in a wireless network (e.g., a WiFi network environment) to achieve Quality of Service (QoS) without saturating a wireless link by exchanging real-time application layer context including UE usage of bandwidth (e.g., WiFi bandwidth) with other UEs in the WiFi network. The UEs can tune their respective usage of the WiFi bandwidth based on the latency requirements of the real-time application being run. Thus, UEs running non-real-time applications adjust (e.g., reduce) WiFi bandwidth usage so that UEs with real-time applications can run with sufficient (e.g., with increased) WiFi bandwidth for transmitting and/or receiving latency sensitive traffic resulting in positive user experience(s).

FIG. 1 illustrates example system 100 implementing traffic engineering for real-time applications, in accordance with some embodiments of the disclosure. System 100 can include user equipment (UE) 120a-120d, access point (AP) 110 providing basic service set (BSS) 130 for wireless communications (e.g., WiFi), backhaul 140, Internet 150, and server 160. UE 120a-120d may utilize wireless channel 133 (e.g., a 20 MHz or an 80 MHz channel) of BSS 130 to transmit signals to Internet 150, server 160, and/or to other UEs 120 associated with AP 110. UE 120a-120d can be electronic devices that may include but are not limited to a cellular phone, a smart phone, a tablet, a personal digital assistant (PDA), or a laptop. Backhaul 140 may include other APs (not shown). Internet 150 may include but is not limited to, any combination of local area networks (LANs), metropolitan area networks (MANs), and/or wireless local area networks (WLANs).

In some examples, UE 120a-120d may utilize different applications. For example, UE 120a may run a non-real-time application resulting in a substantially large download/upload of data (e.g., a software restoration on UE 120a) shown as transmission 135a on wireless channel 133. UE 120b may run a non-real-time application resulting in data back-up to a cloud network shown as transmission 135b. UE 120c may run a real-time application such as a media streaming application where the streaming is shown as transmission 135c. UE 120d may run a real-time application such as a video call shown as transmission 135d.

Figure 2:
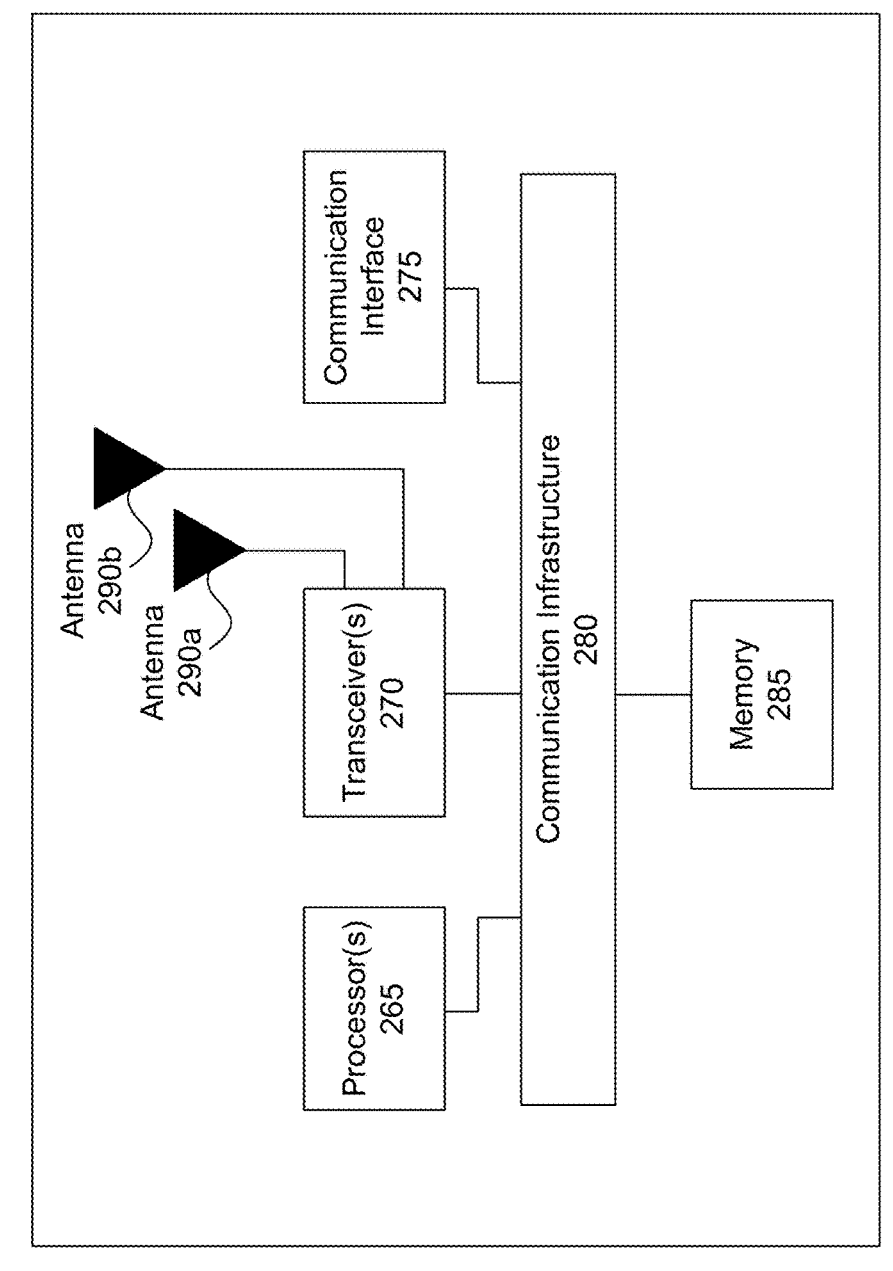
FIG. 2 illustrates a block diagram of an example wireless system supporting traffic engineering for real-time applications, according to some embodiments of the disclosure.

FIG. 2 illustrates a block diagram of example wireless system 200 supporting traffic engineering for real-time applications, according to some embodiments of the disclosure. For explanation purposes and not a limitation, FIG. 2 may be described with reference to elements from FIG. 1. For example, system 200 may be any of the electronic devices: AP 110, UE 120a-120d, and server 160 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications supporting traffic engineering for real-time applications described herein. In some embodiments, one or more processors 265 can be "hard coded" to perform the functions described herein. Transceiver(s) 270 transmits and receives wireless communications signals including wireless communications supporting traffic engineering for real-time applications according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

A network may be considered congested whenever aggregated demand for a link bandwidth exceeds the available link capacity. Some mechanisms to control congestion focus on wired network environment paradigms. These mechanisms focus on retaining high link utilization, and fair resource sharing while preserving robust operation against variations in traffic conditions. End-to-end congestion control mechanisms look for congestion control signals that occur between two endpoints. The mechanisms commonly look for congestion signals (e.g., packet loss, round trip time (RTT), queueing delay, throughput, queue size, retransmit timeout, and segment size) and may perform end-to-end congestion control mechanisms including additive-increase/multiplicative-decrease (AIMD) algorithm, slow start, fast recovery, and rate control.

But, in wireless networks the end-to-end congestion control mechanisms are inadequate. Most end-to-end congestion control mechanisms consider packet loss and queuing delay that packets experience in a wireless medium as a constant additive noise. This means that if a packet loss occurs somewhere in back-haul 140, end-to-end congestion control mechanisms are triggered that can result in underutilizing the wireless medium (e.g., BSS 130) where the conditions could be favorable. Another signal these mechanisms consider is RTT 170 that can be challenging. For instance, RTT 170 varies based on a physical distance between a source and a destination, the number of nodes in the path, the amount of traffic in a LAN, and the load that each node experiences. Thus, packet loss, queueing delay, and/or a larger RTT 170 can be attributed to wireless channel 133, backhaul 140, and/or Internet 150, for example. Given that there is no clear breakdown of which part of the network (e.g., system 100) is congested, taking action on the whole network (e.g., end-to-end congestion control mechanism) may result in underutilizing parts of the network (e.g., system 100). If the cause of congestion is due to the wireless medium (e.g., BSS 130), in some embodiments, local action can be taken by slowing down background tasks which could be taking a disproportional share of bandwidth, and causing a reduction of bandwidth available for real-time applications to perform.

Figures 3A, 3B:
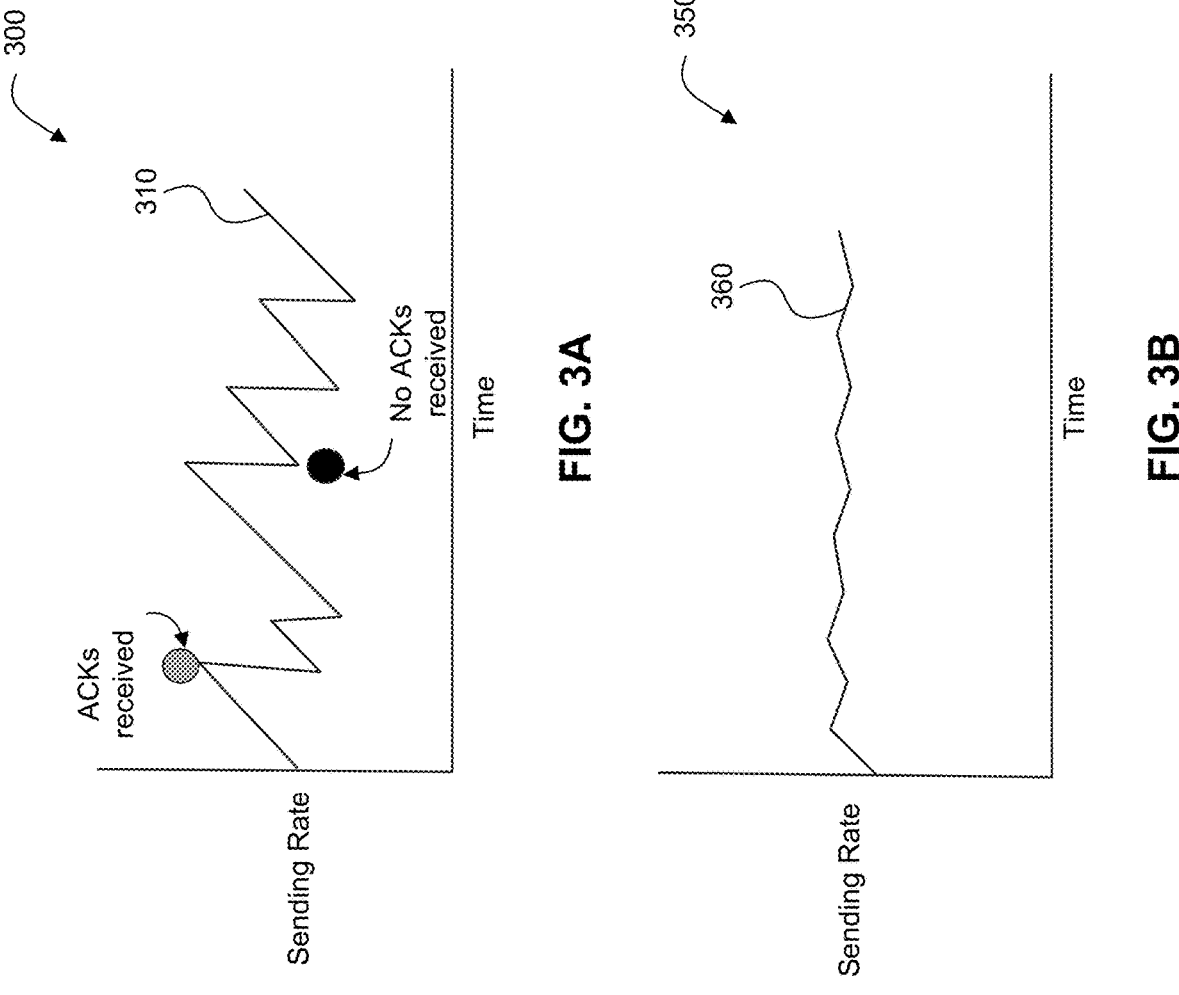
FIG. 3A illustrates an example of a sending rate in a wireless channel with congestion control.
FIG. 3B illustrates an example of a sending rate in a wireless channel with traffic engineering for real-time applications, according to some embodiments of the disclosure.

FIG. 3A illustrates example 300 of sending rate 310 in a wireless channel with congestion control. For explanation purposes and not a limitation, FIG. 3A may be described with reference to elements from FIG. 1. For example, sending rate 310 may represent bandwidth usage from UE 120d of FIG. 1 running a real-time application, e.g., a video call, and UE 120b of FIG. 1 running a non-real-time application transmitting backup data to a cloud network, where each of the applications transmitting with equal number of flows (e.g., Transmission Control Protocol (TCP)

flows). By applying certain congestion control mechanisms, sending rate 310 follows a see-saw throughput where bandwidth on wireless channel 133 can be shared equally. While a fair share mechanism seems useful, the real-time application running on UE 120d transmitting and receiving latency sensitive traffic may not access sufficient bandwidth. Thus, real-time applications may appear to be faulty, perform poorly, or fail, resulting in poor user experience(s).

FIG. 3B illustrates example 350 of sending rate 360 in a wireless channel employing traffic engineering for real-time applications, according to some embodiments of the disclosure. For explanation purposes and not a limitation, FIG. 3B may be described with reference to elements from FIG. 1 such as UE 120b and 120d. By applying traffic engineering for real-time applications as disclosed herein, some embodiments normalize congestion experienced in layer 2 (e.g., data link layer of the open systems interconnection (OSI) model.) Rather than implementing a fair share mechanism across devices or within a device that may be running both real-time and non-real-time applications, some embodiments employ traffic engineering that reduces transmissions for non-real-time applications so that real-time applications can have timely and sufficient access to bandwidth that result in fairness across devices as well as fairness within a device.

As the number of WiFi devices (e.g., UEs 120) increase, wireless channel 133 utilization also increases and applications running on each of the UE 120 devices have to contend to acquire corresponding shares of bandwidth. Real-time applications are latency and throughput sensitive applications. When real-time applications equally share bandwidth with non-real-time applications and/or background tasks, the user experience can be poor. The problem exacerbates when an application uses an Access Category (AC) incorrectly or when an Internet Service Provider (ISP) downgrades all downlink traffic to AC best effort (AC_BE) or AC background (AC_BK) AC. For example, downlink traffic in home like environments from an ISP are marked as AC_BK and are marked as AC_BE in enterprise environment. This means that a non-real-time application performing a software download transmission 135a would share equal bandwidth with a real-time application like a video call transmission 135d when the applications are running on different devices or on the same device. Accordingly, when the real-time application running on UE 120d does not access sufficient bandwidth, the user may see hiccups and glitches in the real-time application performance.

Figure 4:
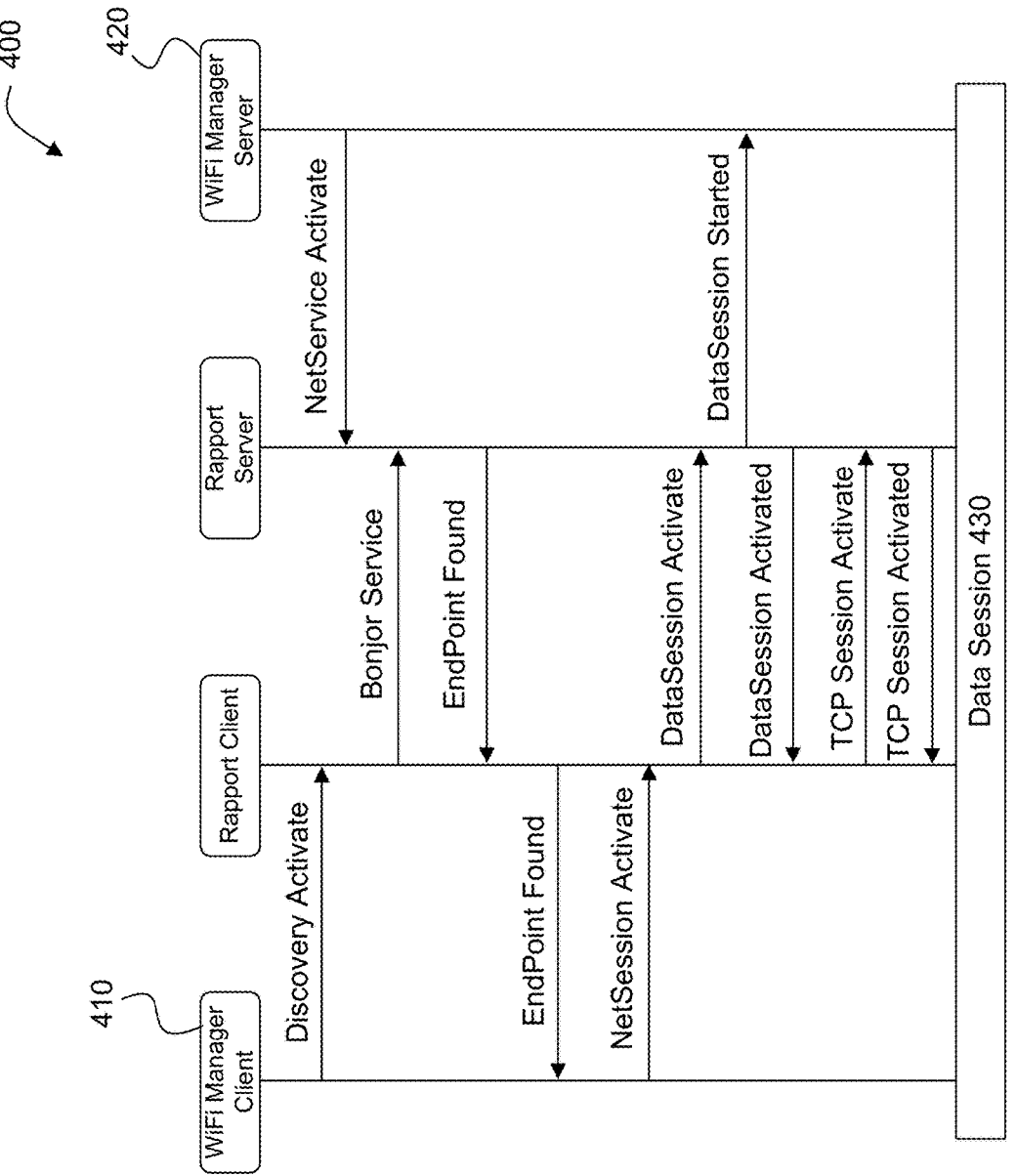
FIG. 4 illustrates an example establishment of a Rapport communication channel, according to some embodiments of the disclosure.

FIG. 4 illustrates example 400 of the establishment of a Rapport communication channel, according to some embodiments of the disclosure. For explanation purposes and not a limitation, FIG. 4 may be described with reference to elements from FIG. 1. For example, WiFi manager client 410 may correspond to UE 120d of system 100, and WiFi manager server 420 may correspond to UE 120a. Instead of applying a fair share mechanism (e.g., equal bandwidth access) across devices, some embodiments include creating a communication channel across devices connected to BSS 130, exchanging application context securely, and applying QoS access to wireless channel 133 accordingly. In some embodiments, the communication channel established across devices (e.g., UE 120a-120d) is secure, non-disruptive to on-going traffic (e.g., corresponding to real-time and non-real-time applications running on devices UE 120a-120d), easy to discover other UEs 120, and on the same WiFi network (e.g., BSS 130.) Some embodiments include establishing a Rapport communication channel where the traffic engineering does not cause any additional cost (e.g., any significant bandwidth usage on wireless channel 133).

In example 400, UE 120*d* running a real-time application may initiate a Rapport communication with UE 120*a* running a non-real-time application resulting in the establishment of data session 430 which is a Rapport session. UE 120*d* running a real-time application may determine whether UE 120*d* can access sufficient wireless channel 133 to transmit and/or receive the corresponding latency sensitive traffic. UE 120*d* can monitor traffic based on applications running on UE 120*d*, receive (or determine) link quality metrics (LQM), and generate a payload that includes application context and link health of a link (e.g., transmission 135*d*) corresponding to the real-time application. UE 120*d* can transmit the payload to UE 120*a* via data session 430, an intra-BSS WiFi communication. UE 120*a* running a non-real-time application can receive the payload and determine whether to implement congestion control mechanisms to reduce usage of wireless channel 133 (e.g., reduce traffic on transmission 135*a* corresponding to the non-real-time application). Thus, UE 120*a* uses less of wireless channel 133 that may be used by UE 120*d* for transmission 135*d* transmitting and/or receiving traffic corresponding to the real-time application.

Figure 5:
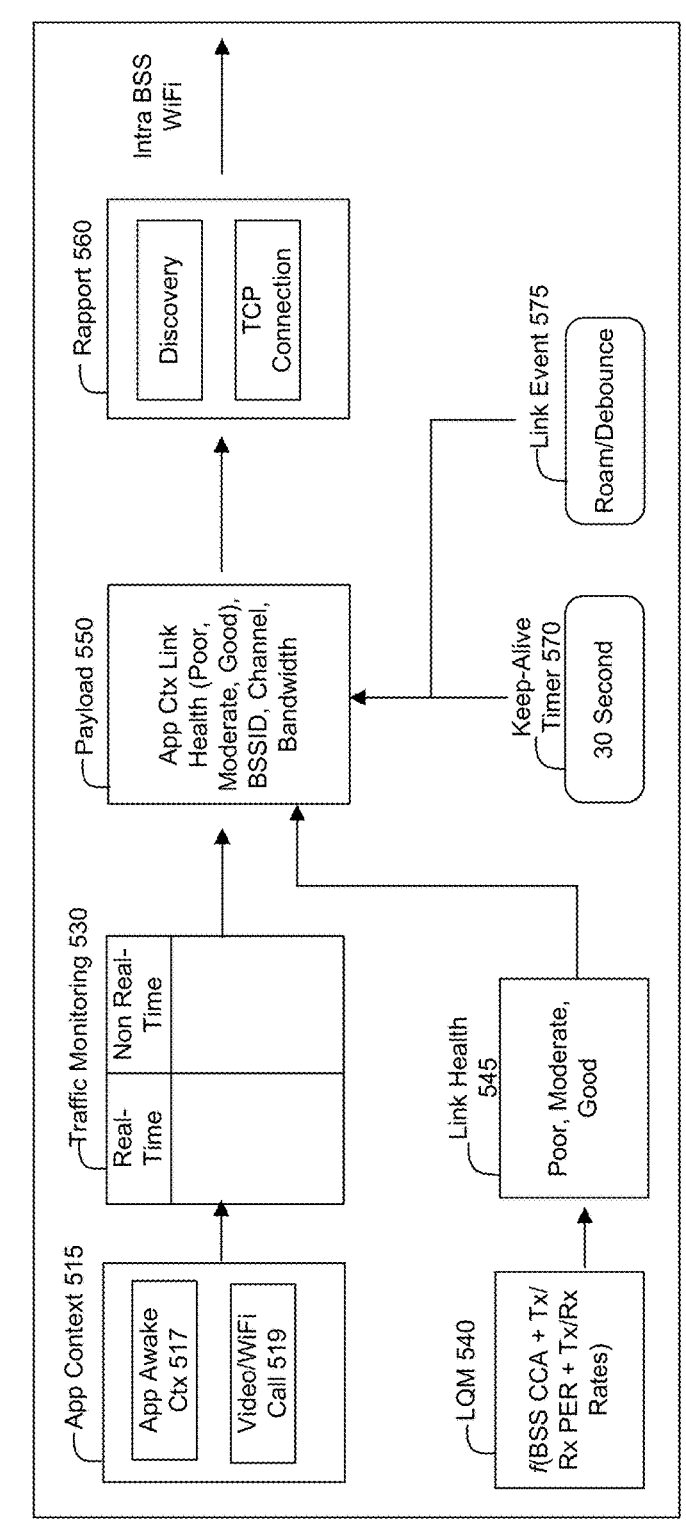
FIG. 5 illustrates a block diagram of a user equipment (UE) running a real-time application and implementing traffic engineering for real-time applications, according to some embodiments of the disclosure.

FIG. 5 illustrates block diagram 500 of a UE running a real-time application and implementing traffic engineering for real-time applications, according to some embodiments of the disclosure. For explanation purposes and not a limitation, FIG. 5 may be described with reference to elements from figures within the disclosure. For example, the functions of FIG. 5 can be performed by UE 120*d* of FIG. 1 that runs a real-time application, or system 200 of FIG. 2. In embodiments, FIG. 5 can be performed by one or more processors, such as processors 265. Some embodiments employ traffic engineering for real-time applications that result in fairness across devices on the same BSS (e.g., BSS 130). For example, UE 120*d* running a real-time application can send a request to a device running a non-real-time application (e.g., UE 120*a*) to slow down the non-real-time application traffic on transmission 135*a* to avoid a bottleneck link utilization (e.g., bottleneck wireless channel 133). In some embodiments, UE 120*d* creates a payload using a Rapport framework to send a request to other devices (e.g., UE 120*a*-120*c*). In example 600 shown in FIG. 6, UE 120*a* running a non-real-time application can receive information (e.g., the payload) from UE 120*d* running a real-time application and take actions accordingly. Examples of actions can include sharing the channel bandwidth (e.g., wireless channel 133) by downgrading non-real-time application background tasks, which make way for real-time applications to run with sufficient bandwidth.

Example 500 can be UE 120*d*. App Context 515 can receive or generate application traffic information and/or application level requirements. Application traffic information can include but is not limited to a traffic data structure, a version of the data structure, foreground details, foreground current traffic, background current traffic, expected foreground current traffic, and foreground predicted traffic. As an example and not a limitation AppAware Context 517 can generate AppAware data as a structure and the structure may be as follows:

```
typedef struct {
    uint64_t ti_version;
    uint64_t ti_foreground_details;
    uint64_t ti_foreground_current_traffic;
    uint64_t ti_background_current_traffic;
```

```
    uint64_t ti_ex_foreground_current_traffic;
    uint64_t ti_foreground_predicted_traffic;
} traffic info;
```

Application context 515 can also receive or generate application level requirements that can include but is not limited to the following: jitter, latency, loss tolerance, duration, required minimum bandwidth, and/or preferred bandwidth. The WiFi layer of UE 120*d* can subscribe to a network agent of UE 120*d* and can receive indications regarding video and/or WiFi call initiation and terminations. Thus, video/WiFi call 519 can receive video and/or WiFi call indications for application context 515.

In some embodiments, traffic monitoring 530 can monitor the application traffic from application context 515 (e.g., traffic flowing on the WiFi interface) to determine whether a real-time application (e.g., real time application) is launched or used or whether a non-real-time application is launched or used. Examples of real-time and non-real-time applications are shown below in Table 1. In some embodiments, traffic monitoring 530 can monitor the traffic flowing on the WiFi interface and classify real time packets as AC voice (AC_VO) and AC video (AC_VI) and background packets as AC_BE and AC_BK. In some embodiments the determination and classification of real-time and non-real-time applications is based on packet flow rate satisfying a settable threshold.

TABLE 1

| Examples of Real-time and Non-Real-Time Applications. | |
|---|---|
| Real-time | Non-Real-Time |
| Video call (e.g., WebEx ®, FaceTime ®) | Cloud Backup |
| WiFi Calling | Software Download |
| Streaming media (e.g., Apple TV ®, NetFlix ®) | Photos Backup |
| | High UL/DL from BG Application |

In some embodiments, link quality metrics (LQM) 540 can receive and/or determine LQM corresponding to a WiFi link utilized by the real-time application, and LQM 540 can assess a link health of a link (e.g., transmission 135*d*) corresponding to the real-time application running on example 500. For example, LQM 540 can utilize the following information to analyze the link health of the link: LQM received, BSS 130 clear channel assessment (CCA), transmit/receive (Tx/Rx) packet error rate (PER), and/or Tx/Rx rates. Link health 545 can utilize the output of LQM 540 to assess a link health of the link. Example assessments are shown below:

Good=(Intra BSS CCA<60%), no packet loss with healthy rates (based on Single Input Single Output (SISO)/Multiple Input Multi Output (MIMO) Association);

Moderate=(Intra BSS CCA within 60% to 80%), with less than 'x'% PER, where x is settable; and Poor=((Intra BSS CCA>80%), with more than 'x'% PER and bad Tx/Rx rates, where x is settable.

Payload 550 can construct a payload based on information from traffic monitoring 530 and link health 545. For example, UE 120*d* running real-time application can create a payload using a Rapport framework to send a request to other devices to, for example, inform the other UEs 120 (e.g., UE 120*a*) that UE 120*d* is not able to access sufficient bandwidth (e.g., link health is determined to be moderate or poor.) The payload can include Application Context 515 output (e.g., application in foreground (FG) (e.g., in use)/ application in background (BG) (e.g., a podcast application running in the background), UL/DL Tx/Rx rate, bandwidth, latency); link health; BSS identifier (BSSID); channel, and/or bandwidth). Rapport 560 can transmit the payload to UE 120a via intra BSS WiFi communications (e.g., via data session 430 of FIG. 4) on BSS 130.

In some embodiments, a device running a real-time application (e.g., example 500 such as UE 120d) can inform interested peers about UE 120d's application context. Thus, devices (e.g., late comer devices) that join BSS 130 later can be informed. If the late comer devices intend to run non-real-time applications, the late comer devices can be informed and can back-off access to wireless channel 133 and make way for real-time applications like that of UE 120d to obtain sufficient bandwidth on wireless channel 133. In some embodiments, after a Rapport session is established, a keep-alive mechanism (e.g., a keep-alive timer 570) can be employed to transmit an updated payload to interested UEs 120 on BSS 130 to ensure that interested peers have updated information about each other. Keep-alive timer 570 can have a settable timeout period (e.g., 30 seconds) and transmits the payload to all interested peers with updated information each time the settable timeout period expires. The keep-alive timer 570 can be reset.

In some embodiments, link event 575 can receive information and/or determine when UE 120d roams to a different BSSID, losses a link to BSS 130 by walking away, or the real-time application on UE 120d ends a corresponding session. Keep-alive timer 570 can send the payload including the updated link event information to all interested peers.

Figure 6:
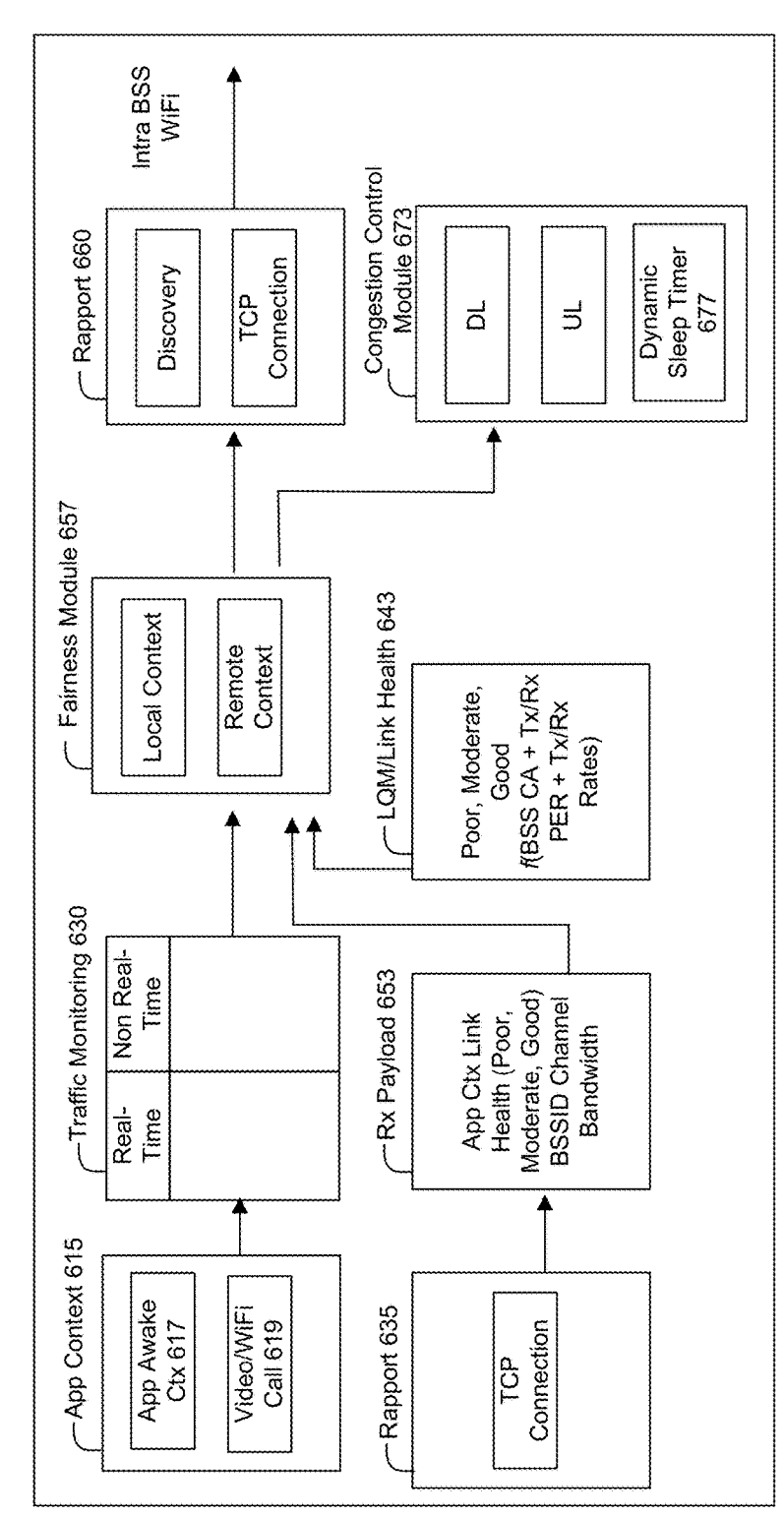
FIG. 6 illustrates a block diagram of a UE running a non-real-time application and implementing traffic engineering for real-time applications, according to some embodiments of the disclosure.

FIG. 6 illustrates block diagram 600 of a UE running a non-real-time application and implementing traffic engineering for real-time applications, according to some embodiments of the disclosure. For explanation purposes and not a limitation, FIG. 6 may be described with reference to elements from figures within the disclosure. For example, the functions of FIG. 6 can be performed by UE 120a of FIG. 1 that runs a non-real-time application, or system 200 of FIG. 2. In embodiments, FIG. 6 can be performed, or caused to be performed, by one or more processors, such as processors 265. Some embodiments employ traffic engineering for real-time applications that result in fairness across devices. For example, UE 120a running a non-real-time application can receive information (e.g., the payload) from UE 120d running a real-time application and take actions accordingly. Examples of actions can include sharing the channel bandwidth (e.g., wireless channel 133) by downgrading non-real-time application background tasks, which make way for real-time applications to run with sufficient bandwidth.

App Context 615 can receive or generate application traffic information and/or application level requirements. Application traffic information can include but is not limited to a traffic data structure, a version of the data structure, foreground details, foreground current traffic, background current traffic, expected foreground current traffic, and foreground predicted traffic. As an example and not a limitation App Aware Context 617 can generate App Aware data as a structure as shown above with regard to App Aware Context 517 and example 500.

Application context 615 can also receive or generate application level requirements that can include but is not limited to the following: jitter, latency, loss tolerance, duration, required minimum bandwidth, and/or preferred bandwidth. The WiFi layer of UE 120a can subscribe to a network agent of UE 120a and can receive indications regarding video and/or WiFi call initiation and terminations.

Thus, video/WiFi call 619 can receive video and/or WiFi call indications for application context 615.

In some embodiments, traffic monitoring 630 can monitor the application traffic (e.g., traffic flowing on the WiFi interface) to determine whether a real-time application is launched or used or whether a non-real-time application is launched or used. In some embodiments, traffic monitoring 630 can monitor the traffic flowing on the WiFi interface and classify real time packets as AC voice (AC_VO) and AC video (AC_VI) and background packets as AC_BE and AC_BK. In some embodiments the determination and classification of real-time and non-real-time applications is based on packet flow rate satisfying a settable threshold.

Rapport 635 can establish a TCP connection with other UEs 120 (e.g., UE 120d running a real-time application.) Receive (Rx) payload 653 can receive a payload using the Rapport framework via an intra BSS WiFi communication (e.g., via data session 430 of FIG. 4) from UE 120d.

In some embodiments, LQM/Link Health 643 can receive and/or determine LQM corresponding to a WiFi link (e.g., transmission 135a) utilized by the non-real-time application, and assess a link health of the link. For example, LQM/Link Health 643 can utilize the following information to analyze the link health of the link: LQM received, BSS 130 CCA, Tx/Rx PER, and/or Tx/Rx rates (e.g., UL/DL rates). LQM/Link Health 643 can assess a link health of the link corresponding to the non-real-time application. Example assessments are shown above with regard to example 500.

Fairness module 657 can analyze the payload information received corresponding to the real-time application running (e.g., remotely) on example 500, as well as the link health of the link (e.g., transmission 135a) corresponding to the non-real-time application running locally on example 600. Fairness module 657 can determine whether to initiate congestion control mechanisms to enable fairness among devices. If for example, the received payload indicates that a requesting device, UE 120d running a real-time application, has a corresponding link health (e.g., transmission 135d) that is moderate or below moderate level, fairness module 657 can decide to take action to reduce (e.g., transmission 135a) usage of the bandwidth, thereby allowing more bandwidth to be available for UE 120d's transmission 135d (and other UEs 120) running a real-time application(s) to access sufficient bandwidth for normal operation of the real-time application(s).

When fairness module 657 determines to initiate control mechanisms, congestion control module 673 can employ congestion control mechanisms including but not limited to: dynamic sleep timer 677, frame burst transmissions, and/or limited aggregations.

Radio wake-up time and hence the amount of data exchange from background tasks can be curbed by varying a value of dynamic sleep timer 677. Some embodiments employ an additive decrease method to limit the value of the dynamic sleep timer 677. A smaller dynamic sleep timer 677 value enables a processor of UE 120a running non-real-time applications to return to sleep faster than a larger dynamic sleep timer 677 value. Tuning the dynamic sleep timer 677 impacts both UL and DL transmissions (e.g., non-real-time applications running on example 600 (e.g., UE 120a)). Most of the traffic both for UL and DL are bursty in nature. The gap between burst of packets depends on how many flows the background application creates. Dynamic sleep timer 677 value can be tuned based on how bursty the packets are. In general, a dynamic sleep timer 677 value will start below a configured threshold value and the dynamic sleep timer 677 value can be tuned based on packet patterns (e.g., packet patterns of a real-time application of UE 120*d* corresponding to a link health of a link (e.g., transmission 135*d*). As an example, when the link health of the link (e.g., transmission 135*d*) corresponding to the real-time application is moderate, the dynamic sleep timer 677 value can be between 60 ms to 90 ms. When the link health of the link corresponding to the real-time application is poor, then the dynamic sleep timer 677 value of 60 ms can be used. Thus, a smaller dynamic sleep timer 677 value enables a processor of UE 120*a* (e.g., processor(s) 265 of system 200) to return to sleep faster compared to having a larger dynamic sleep timer 677 value. If UE 120*a* running a non-real-time application is also running other applications (or a real-time application), then instead of tuning a dynamic sleep timer 677 value, a dequeue mechanism can be tuned. (See FIG. 7B below.)

In some embodiments, the congestion control mechanisms can include frame burst transmissions. Instead of sending large Aggregated MAC Protocol Data Units (AMP-DUs), UE 120*a* may employ frame burst transmissions where 2 frames are sent with Short Interframe Space (SIFS) in between. This congestion control mechanism is better for handling frame retries. With smaller AMPDU size, the retry frames can be grouped with the following aggregate, and allow for increased efficiency. In some embodiments, frame burst transmissions on UE 120*a* can be disabled to counter congestion (e.g., reduce the rate of transmission of non-real-time application packets) which would result in smaller AMPDU's.

In some embodiments, the congestion control mechanisms can include limited aggregations where UE 120*a* can aggregate multiple WiFi packets of non-real-time application traffic to exchange with AP 110 using an allocated 10 msec of bandwidth. UE 120*a* may limit the aggregation to a smaller number of WiFi non-real-time application packets, for example, to utilize 2 msec, and release 8 msec of the bandwidth to be utilized by UE 120*d* running a real-time application.

In some embodiments, Rapport 660 transmits the results and determinations from fairness module 657 to other peer UEs 120 (e.g., UE 120*d*) via intra BSS WiFi communications.

Figures 7A, 7B:
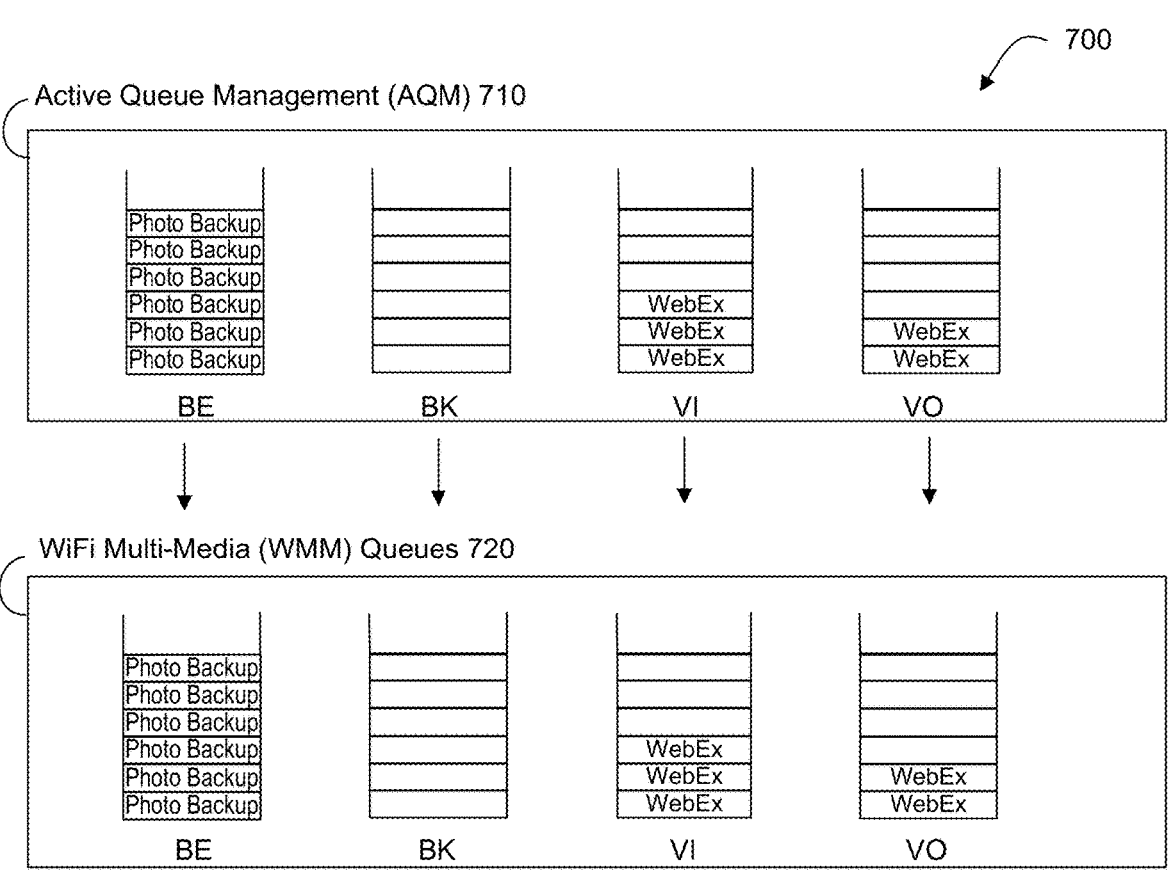
FIG. 7A illustrates an example of traffic in access categories, according to some embodiments of the disclosure.
FIG. 7B illustrates an example of uniform and non-uniform dequeue mechanisms for traffic engineering for real-time applications, according to some embodiments of the disclosure.

FIG. 7A illustrates example 700 of traffic in ACs, according to some embodiments of the disclosure. For explanation purposes and not a limitation, FIG. 7A may be described with reference to elements from figures within the disclosure. For example, the functions of FIG. 7A can be performed by UE 120*a*-120*d* of FIG. 1 or system 200 of FIG. 2. In embodiments, FIG. 7A can be performed, or caused to be performed, by one or more processors, such as processors 265. In some examples, UE 120*d* can run a real-time application and a non-real-time application. For example, UE 120*d* can run a video call application and at the same time transmit a large amount of data (e.g., photo album backup) while the video call is in progress. UE 120*d* may establish 8 TCP flows with a network (e.g., server 160 of FIG. 1) with active queue management (AQM) 710 that is managed by the network stack of UE 120*d*. AQM 710 can dequeue AC_BE to transmit a very large flow of packets to WiFi Multi-media (WMM) queues 720. The burst of packets generated from corresponding 8 TCP ports result in large AMPDUs transmitted over the air (OTA) via wireless channel 133. Frame burst transmission can be enabled to increase the rate of transmission to help transmit the data. The video call application may utilize 2 TCP flows. The video packets are bursty in nature with gaps in between, and the audio packets are periodic. The video call application packets can be queued as AC video (AC_VI) and/or AC voice (AC_VO), in AQM 710 and WMM queues 720, and frame burst transmissions may be enabled.

A snapshot of queues in AQM 710 and the WMM queues 720 shows that the queues used by non-real-time applications are typically filled (e.g., photo backup in AC_BE). Although WMM queues 720 ensures fairness across different access categories, there is an impact if a non-real-time application creates multiple flows and starts transmitting large amounts of data. Given that DL traffic of both the real-time and non-real-time applications are tagged with the same priority, it can be difficult for real time real-time applications to access sufficient bandwidth to send traffic without causing jitters.

FIG. 7B illustrates example 750 of a uniform dequeue mechanism 760 and non-uniform dequeue mechanism 770 for traffic engineering for real-time applications, according to some embodiments of the disclosure. For explanation purposes and not a limitation, FIG. 7B may be described with reference to elements from figures within the disclosure. For example, the functions of FIG. 7B can be performed by UE 120 (e.g., UE 120*d*) of FIG. 1 that runs a real-time application and a non-real-time application, or system 200 of FIG. 2. In embodiments, FIG. 7B can be performed, or caused to be performed, by one or more processors, such as processors 265. When AQM 710 utilizes uniform dequeue mechanism 760, the ACs are dequeued equally in sequence. Employing uniform dequeue mechanism 760 in example 700 above can make it difficult for real time real-time applications to access sufficient bandwidth to send latency sensitive traffic without causing jitters. In some embodiments, UE 120*d* running a real-time application and a non-real-time application can employ non-uniform dequeue mechanism 770 that dequeues latency sensitive traffic of AC_VO and AC_VI more often than the remaining AC categories. For example, AQM 710 can employ non-uniform dequeue mechanism 770 to dequeue AC_VO and AC_VI two times more than AC_BE and AC_BK. Accordingly, real time real-time applications can access sufficient bandwidth to send latency sensitive traffic without causing jitters while throttling traffic from non-real-time applications (e.g., traffic corresponding to AC_BE and AC_BK.)

Figure 8:
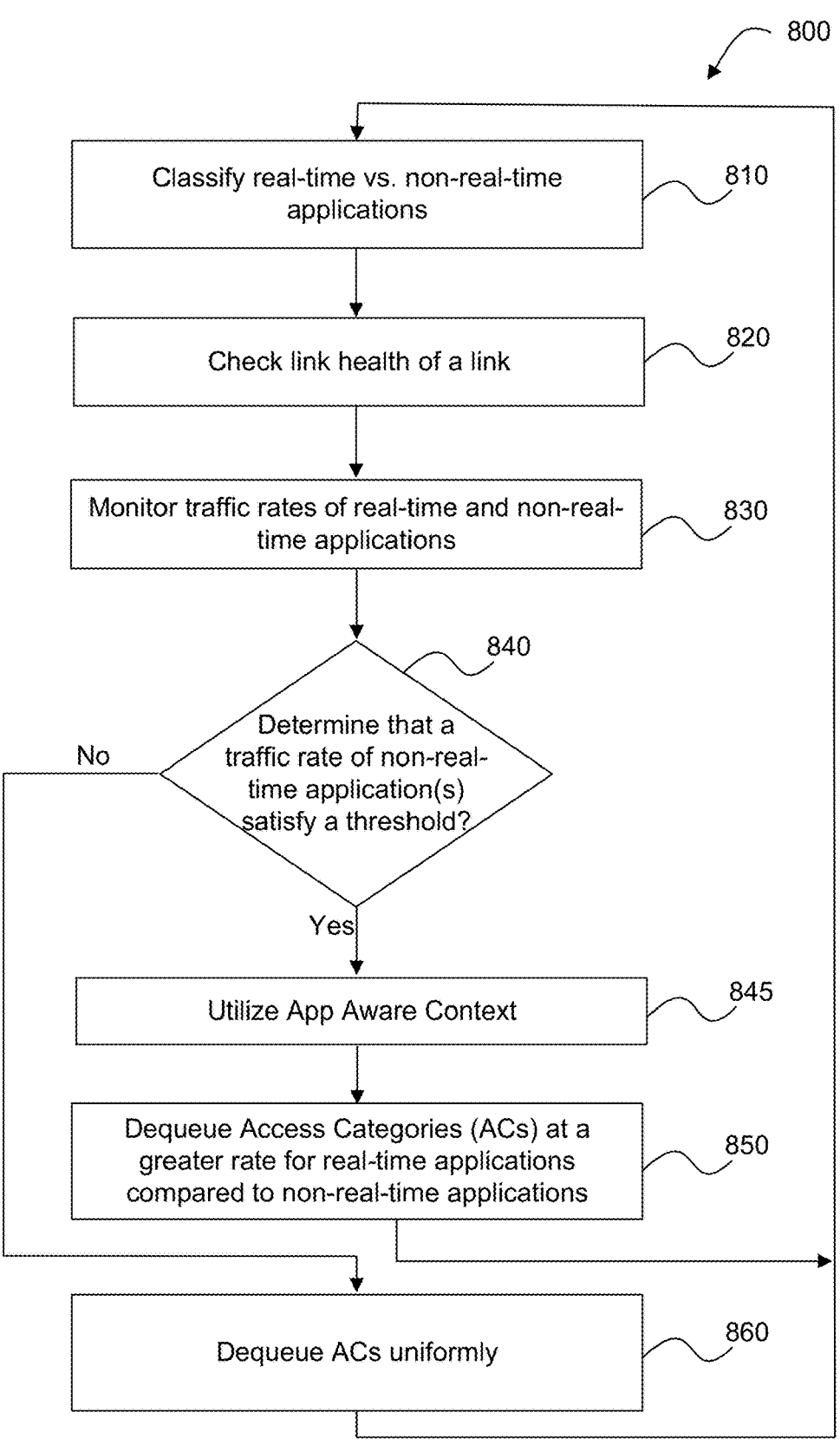
FIG. 8 illustrates an example method for a UE implementing traffic engineering for real-time applications within the UE, according to some embodiments of the disclosure.

FIG. 8 illustrates example method 800 for a UE implementing traffic engineering for real-time applications within a UE, according to some embodiments of the disclosure. For explanation purposes and not a limitation, FIG. 8 may be described with reference to elements from FIG. 1. For example, method 800 may be performed by any of UE 120 (e.g., UE 120*d*) of FIG. 1 that runs a real-time application and a non-real-time application, or system 200 of FIG. 2. In embodiments, FIG. 8 can be performed, or caused to be performed, by one or more processors, such as processors 265. Instead of applying a fair share mechanism within UE 120*d*, some embodiments include classifying real-time vs. non-real-time applications (e.g., tasks), and reducing non-real-time tasks based on a rate of data exchange. Thus, fairness within UE 120*d* enables real-time applications to access sufficient bandwidth to transmit and receive latency sensitive traffic.

At 810, UE 120*d* can classify real-time vs. non-real-time applications.

At 820, UE 120*d* can check the link health of a link corresponding to real-time application(s).

At 830, UE 120*d* can monitor traffic rates of real-time and non-real-time applications.

At 840, UE 120*d* determines whether a traffic rate of the non-real-time application satisfies a threshold. For example, UE 120*d* can determine if a traffic rate from the non-realtime applications (e.g., corresponding to AC_BE and AC_BK) is greater than or equal to twice that of a real-time application. When the non-real-time application satisfies the threshold, method 800 proceeds to 845. Otherwise, method 800 proceeds to 860.

At 845, UE 120*d* can utilize App Aware content as described in FIGS. 5 and 6 to access corresponding real-time and non-real-time application traffic data.

At 850, UE 120*d* can dequeue ACs corresponding real-time applications (e.g., AC_VO and AC_VI) at a greater rate for compared to ACs corresponding to non-real-time applications (e.g., AC_BE and AC_BK). For example, UE 120*d* can dequeue AC_VO and AC_VI two times more than AC_BE and AC_BK.

Method 800 returns to 810.

At 860, when the non-real-time application does not satisfy the settable threshold, UE 120*d* can dequeue ACs uniformly. Method 800 returns to 810.

FIG. 9 illustrates example method 900 for a UE running a real-time application and implementing traffic engineering across devices, according to some embodiments of the disclosure. For explanation purposes and not a limitation, FIG. 9 may be described with reference to elements from figures within the disclosure. For example, the functions of FIG. 9 can be performed by UE 120*d* of FIG. 1 that runs a real-time application, or system 200 of FIG. 2. In embodiments, FIG. 9 can be performed, or caused to be performed, by one or more processors, such as processors 265.

At 905, UE 120*d* can receive and/or determine traffic symptoms.

At 910, UE 120*d* can receive and/or determine application level indications.

At 915, UE 120*d* can monitor traffic flowing to determine application type(s).

At 920, UE 120*d* can receive and/or determine link quality metrics (LQM).

At 925, UE 120*d* can assess a link health of a link (e.g., transmission 135*d*) corresponding to the real-time application running on UE 120*d*.

At 930, UE 120*d* can construct a payload, for example, using a Rapport framework.

At 935, UE 120*d* can transmit the payload (e.g., application context) to peer devices via intra BSS WiFi communications using a Rapport data session.

At 940, UE 120*d* can initiate a keep-alive mechanism (e.g., a keep-alive timer).

At 945, UE 120*d* can receive link event information related to the link corresponding to the real-time application running on UE 120*d*.

At 950, UE 120*d* can transmit updated information regarding link events to peer devices via intra BSS WiFi communications.

Figure 10:
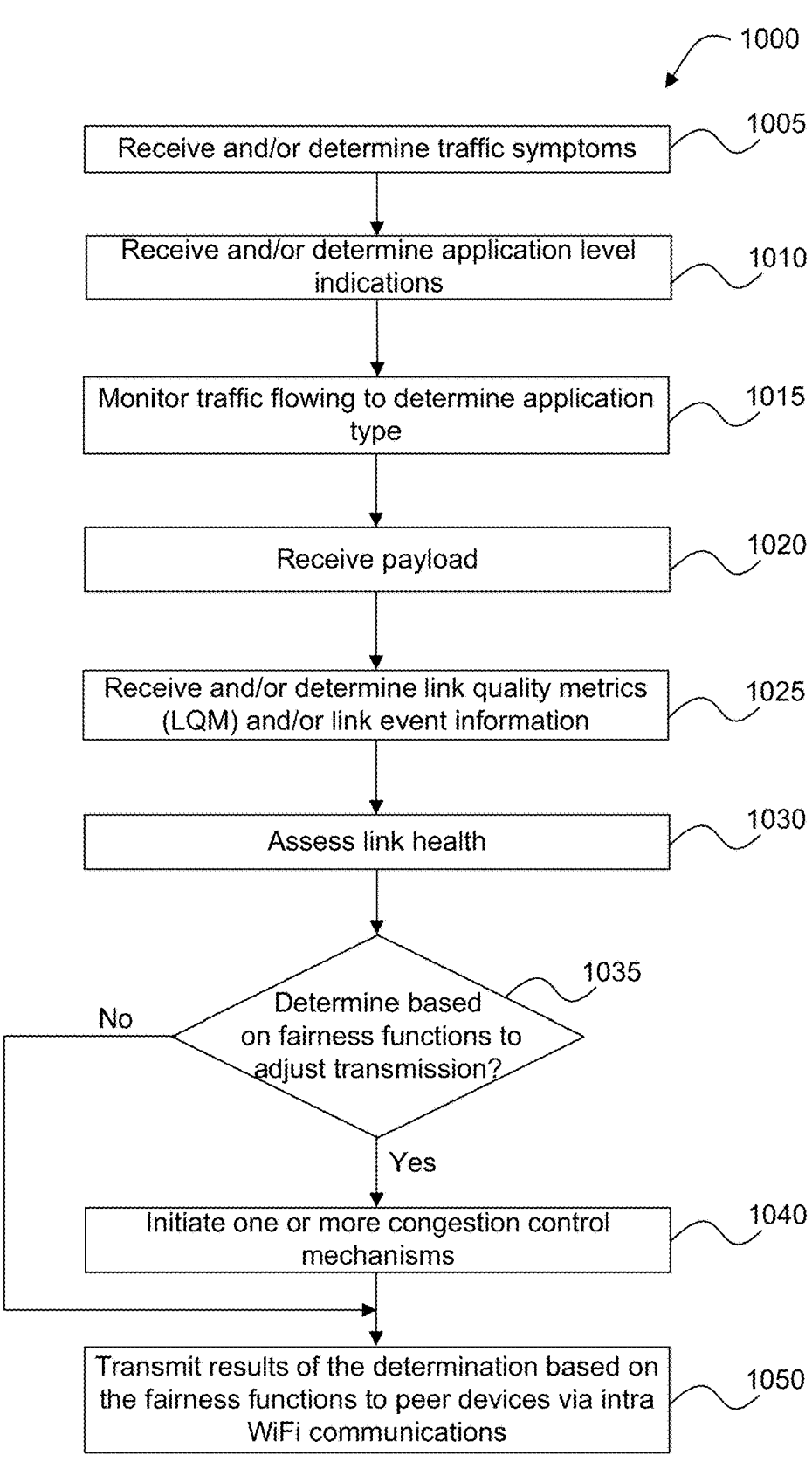
FIG. 10 illustrates an example method for a UE running a non-real-time application and implementing traffic engineering across devices, according to some embodiments of the disclosure.

FIG. 10 illustrates example method 1000 for a UE running a non-real-time application and implementing traffic engineering across devices, according to some embodiments of the disclosure. For explanation purposes and not a limitation, FIG. 10 may be described with reference to elements from figures within the disclosure. For example, the functions of FIG. 10 can be performed by UE 120*a* of FIG. 1 that runs a non-real-time application, or system 200 of FIG. 2.

At 1005, UE 120*a* can receive and/or determine traffic symptoms.

At 1010, UE 120*a* can receive and/or determine application level indications.

At 1015, UE 120*a* can monitor traffic flowing to determine an application type (e.g., real-time or non-real-time application).

At 1020, UE 120*a* can receive the payload using the Rapport framework, where the payload is from a device running a real-time application (e.g., UE 120*d* of FIG. 1).

At 1025, UE 120*a* can receive and/or determine link quality metrics (LQM) and/or link event information relating to a link (e.g., transmission 135*a*) corresponding to a non-real-time application running on UE 120*a*.

At 1030, UE 120*a* can assess a link health of the link corresponding to the non-real-time application running on UE 120*a*.

At 1035, UE 120*a* can determine based on fairness functions to adjust non-real-time application traffic transmission. For example, if the payload indicates that a link health of a link corresponding to a real-time application of UE 120*d* is moderate or below, then UE 120*a* can determine to transmit less non-real-time application traffic. When the fairness function determines that the non-real-time application traffic is to be adjusted, method 1000 proceeds to 1040. Otherwise, method 1000 proceeds to 1050.

At 1040, UE 120*a* can initiate one or more congestion control mechanisms including but not limited to dynamic sleep timer 677, frame burst transmissions, and/or limited aggregations.

At 1050, UE 120*a* transmits results of the determination based on the fairness functions to peer devices via intra BSS WiFi communications.

Some embodiments employ traffic engineering for real-time applications that result in fairness across or among devices, as well as fairness within a device. For example, UE 120*d* can implement method 800 of FIG. 8, method 9 of FIG. 9, and/or method 10 of FIG. 10.

Figure 11:
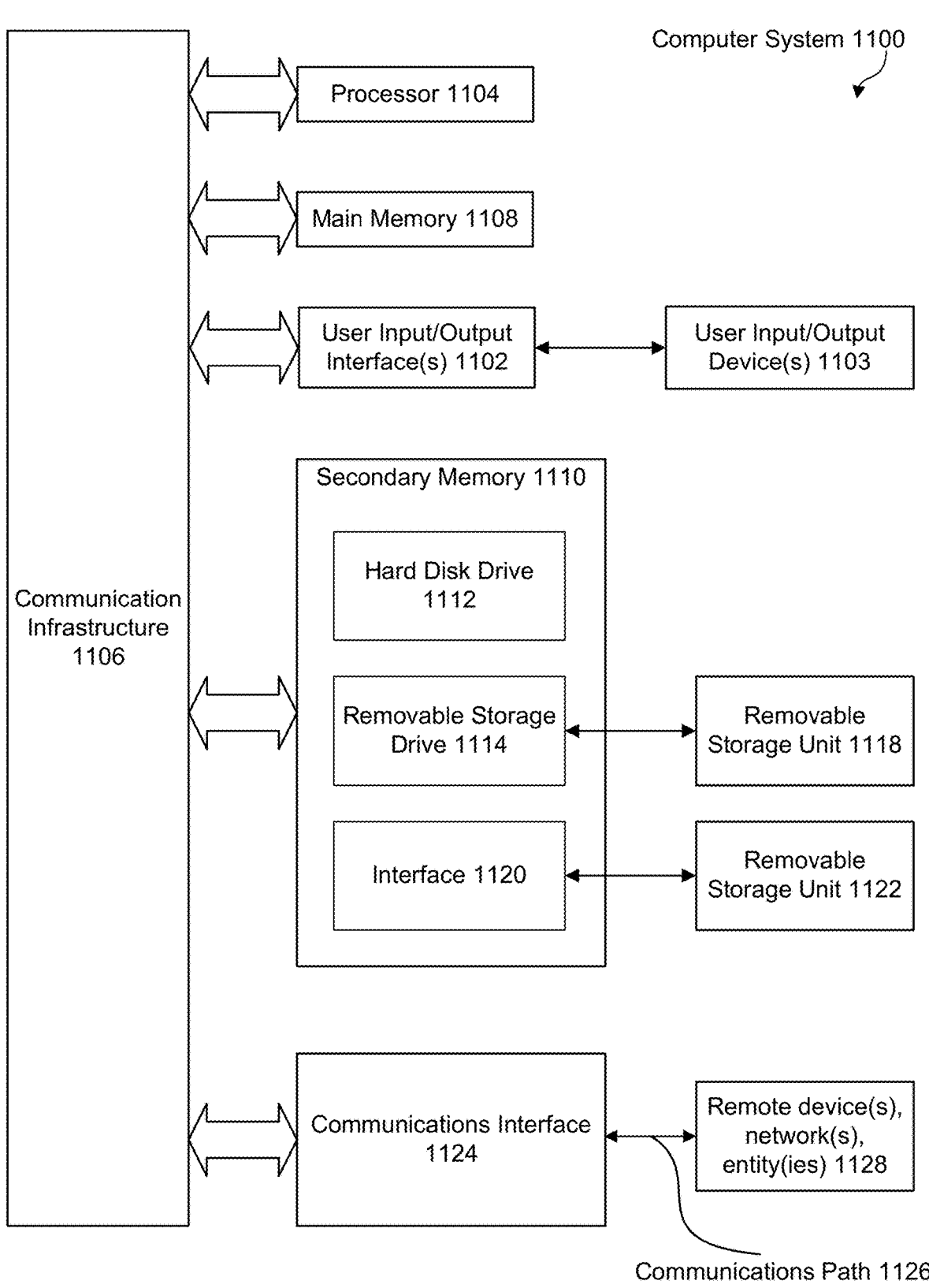
FIG. 11 illustrates an example computer system for implementing some embodiments or portion(s) thereof.

Various embodiments can be implemented, for example, using one or more well-known computer systems, such as computer system 1100 shown in FIG. 11. Computer system 1100 can be any well-known computer capable of performing the functions described herein. For example, and without limitation, UE 120*a*-120*d*, AP 110, and/or server 160 of FIG. 1, system 200 of FIG. 2, examples 400-600 of FIGS. 4-6, example 750 of FIG. 7B, methods 800-1000 of FIGS. 8-10, (and/or other apparatuses and/or components shown in the figures) may be implemented using computer system 1100, or portions thereof. Computer system 1100 includes one or more processors (also called central processing units, or CPUs), such as a processor 1104. Processor 1104 is connected to a communication infrastructure 1106 that can be a bus. One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A wireless device comprising:
a transceiver; and
a processor communicatively coupled to the transceiver, configured to:
    detect a real-time application running on the wireless device;
    assess a link health of a link corresponding to the real-time application, wherein the link is associated with a WiFi channel;
    subsequent to the assessment, monitor a traffic rate of the real-time application and a traffic rate of a non-real-time application running on the wireless device;
    determine that the traffic rate of the non-real-time application satisfies a threshold; and
    subsequent to the determination, dequeue an access category corresponding to the real-time application at a greater rate than an access category corresponding to the non-real-time application.

2. The wireless device of claim 1, wherein to detect the real-time application running on the wireless device, the processor is configured to:
    receive a traffic symptom comprising: current foreground traffic, current background traffic, or predicted foreground traffic;
    receive an application indication comprising: a jitter, a latency, a loss tolerance, a duration, a required minimum bandwidth, or a preferred bandwidth;
    monitor a traffic flow corresponding to the traffic symptom or the application indication; and
    detect the real-time application based at least on the monitored traffic flow.

3. The wireless device of claim 1, wherein to assess the link health, the processor is further configured to:
    receive a link quality metric corresponding to the link;
    determine based at least on the link quality metric, an intra basic service set (BSS) clear channel assessment (CCA) percentage corresponding to the link; and
    assess the link health based at least on the intra BSS CCA percentage.

4. The wireless device of claim 1, wherein the processor is configured to construct a payload comprising: a basic service set (BSS) identifier (BSSID), a channel identifier, a bandwidth, or an application context.

5. The wireless device of claim 1, wherein the processor is further configured to:
    initiate a Rapport session with a peer device via WiFi communications;
    activate a keep-alive timer corresponding to the real-time application; and
    transmit updated information to the peer device according to the keep-alive timer.

6. The wireless device of claim 5, wherein the processor is further configured to:
    receive link event information corresponding to the link; and transmit second updated information to the peer device according to the link event information, wherein the link event information comprises: a disconnect of the link, or an indication that the wireless device has roamed.

7. The wireless device of claim 1, wherein the greater rate for dequeuing the real-time application access category is at least two times that of the non-real-time application access category.

8. The wireless device of claim 1, wherein the processor is further configured to:
    transmit, via the transceiver to a peer device, a payload comprising the link health; and
    receive, via the transceiver from the peer device, an analysis result based on the payload indicating the link health has improved.

9. The wireless device of claim 8, wherein the link health improvement corresponds to a reduction of an intra BSS clear channel assessment (CCA) rate, a decrease in a transmit/receive (Tx/Rx) packet error rate (PER), or an increase in a Tx/Rx rate.

10. A method for a wireless device comprising:
    detecting a real-time application running on the wireless device;
    assessing a link health of a link corresponding to the real-time application, wherein the link is associated with a WiFi channel;
    subsequent to the assessment, monitoring a traffic rate of the real-time application and a traffic rate of a non-real-time application running on the wireless device;
    determining that the traffic rate of the non-real-time application satisfies a threshold; and
    subsequent to the determination, dequeuing an access category corresponding to the real-time application at a greater rate than an access category corresponding to the non-real-time application.

11. The method of claim 10, wherein the detecting the real-time application running on the wireless device comprises:
    receiving a traffic symptom comprising: current foreground traffic, current background traffic, or predicted foreground traffic;
    receiving an application indication comprising: a jitter, a latency, a loss tolerance, a duration, a required minimum bandwidth, or a preferred bandwidth;
    monitoring a traffic flow corresponding to the traffic symptom or the application indication; and
    detecting the real-time application based at least on the monitored traffic flow.

12. The method of claim 10, wherein the assessing the link health comprises:
    receiving a link quality metric corresponding to the link;
    determining based at least on the link quality metric, an intra basic service set (BSS) clear channel assessment (CCA) percentage corresponding to the link; and
    assessing the link health based at least on the intra BSS CCA percentage.

13. The method of claim 10, further comprising:
    initiating a Rapport session with a peer device via WiFi communications;
    activating a keep-alive timer; and
    transmitting first updated information to the peer device according to the keep-alive timer.

14. The method of claim 13, further comprising:
    receiving link event information corresponding to the link; and transmitting second updated information to the peer device according to the link event information, wherein the link event information comprises: a disconnect of the link, or an indication that the wireless device has roamed.

15. A non-transitory computer-readable medium storing instructions that, when executed by a processor of a wireless device, cause the wireless device to perform operations, the operations comprising:

detecting a real-time application running on the wireless device;

assessing a link health of a link corresponding to the real-time application, wherein the link is associated with a WiFi channel;

subsequent to the assessment, monitoring a traffic rate of the real-time application and a traffic rate of a non-real-time application running on the wireless device;

determining that the traffic rate of the non-real-time application satisfies a threshold; and subsequent to the determination, dequeuing an access category corresponding to the real-time application at a greater rate than an access category corresponding to the non-real-time application.

16. The non-transitory computer-readable medium of claim 15, wherein to detect the real-time application running on the wireless device, the operations comprise:

receiving a traffic symptom comprising: current foreground traffic, current background traffic, or predicted foreground traffic;

receiving an application indication comprising: a jitter, a latency, a loss tolerance, a duration, a required minimum bandwidth, or a preferred bandwidth;

monitoring a traffic flow corresponding to the traffic symptom or the application indication; and detecting the real-time application based at least on the monitored traffic flow.

17. The non-transitory computer-readable medium of claim 15, wherein to assess the link health, the operations comprise:

receive a link quality metric corresponding to the link;

determine based at least on the link quality metric, an intra basic service set (BSS) clear channel assessment (CCA) percentage corresponding to the link; and assess the link health based at least on the intra BSS CCA percentage.

18. The non-transitory computer-readable medium of claim 15, wherein the operations comprise constructing a payload comprising: a basic service set (BSS) identifier (BSSID), a channel identifier, a bandwidth, or an application context.

19. The non-transitory computer-readable medium of claim 15, wherein the operations further comprise:

initiating a Rapport session with a peer device via WiFi communications;

activating a keep-alive timer corresponding to the real-time application; and transmitting updated information to the peer device according to the keep-alive timer.

20. The non-transitory computer-readable medium of claim 19, wherein the operations further comprise:

receiving link event information corresponding to the link; and transmitting second updated information to the peer device according to the link event information, wherein the link event information comprises: a disconnect of the link, or an indication that the wireless device has roamed.

* * * * *